(12) United States Patent
Kim et al.

(10) Patent No.: US 9,414,020 B2
(45) Date of Patent: Aug. 9, 2016

(54) METHOD AND APPARATUS FOR TRANSMITTING AND RECEIVING VIEWING RESTRICTION INFORMATION OF APPLICATION

(75) Inventors: Kwang-hyuk Kim, Suwon-si (KR); Jung-shin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 776 days.

(21) Appl. No.: 12/261,501

(22) Filed: Oct. 30, 2008

(65) Prior Publication Data

US 2009/0313650 A1    Dec. 17, 2009

(30) Foreign Application Priority Data

Jun. 13, 2008  (KR) .................. 10-2008-0055843

(51) Int. Cl.
*H04N 7/16* (2011.01)
*H04N 21/435* (2011.01)
*H04N 21/45* (2011.01)
*H04N 21/8543* (2011.01)
*H04N 21/8545* (2011.01)

(52) U.S. Cl.
CPC ........... *H04N 7/163* (2013.01); *H04N 21/4351* (2013.01); *H04N 21/4532* (2013.01); *H04N 21/8543* (2013.01); *H04N 21/8545* (2013.01)

(58) Field of Classification Search
CPC .............. H04N 7/163; H04N 21/4351; H04N 21/4532; H04N 21/8543; H04N 21/8545
See application file for complete search history.

(56) References Cited

U.S. PATENT DOCUMENTS

| 2003/0028875 A1 | 2/2003 | Piotrowski |
| 2003/0229899 A1* | 12/2003 | Thompson ......... H04N 7/17318 725/87 |
| 2004/0068757 A1* | 4/2004 | Heredia ...................... 725/135 |
| 2004/0261099 A1* | 12/2004 | Durden et al. ................ 725/32 |
| 2005/0240631 A1* | 10/2005 | Willard ............. H04N 41/0816 |
| 2008/0040748 A1* | 2/2008 | Miyaki ........................ 725/46 |

FOREIGN PATENT DOCUMENTS

| JP | 2004032612 A | 1/2004 |
| KR | 1020040004355 A | 1/2004 |
| KR | 10-2006-0105977 A | 10/2006 |
| KR | 10-2007-0105013 A | 10/2007 |

OTHER PUBLICATIONS

Communication issued on Jan. 15, 2015 by the Korean Intellectual Property Office in related application No. 1020080055843.
Communication dated Oct. 20, 2014 issued by Korean Intellectual Property Office in counterpart Korean Patent Application No. 10-2008-0055843.

* cited by examiner

*Primary Examiner* — Oschta Montoya
(74) *Attorney, Agent, or Firm* — Sughrue Mion, PLLC

(57) ABSTRACT

Provided are a method and apparatus for transmitting/receiving viewing restriction information of an application of data broadcasting. The method includes acquiring an application and viewing restriction information set on a unit-by-unit basis of the application, and performing viewing restriction functions differently for each unit of a plurality of units the application, based on the viewing restriction information which is acquired.

19 Claims, 8 Drawing Sheets

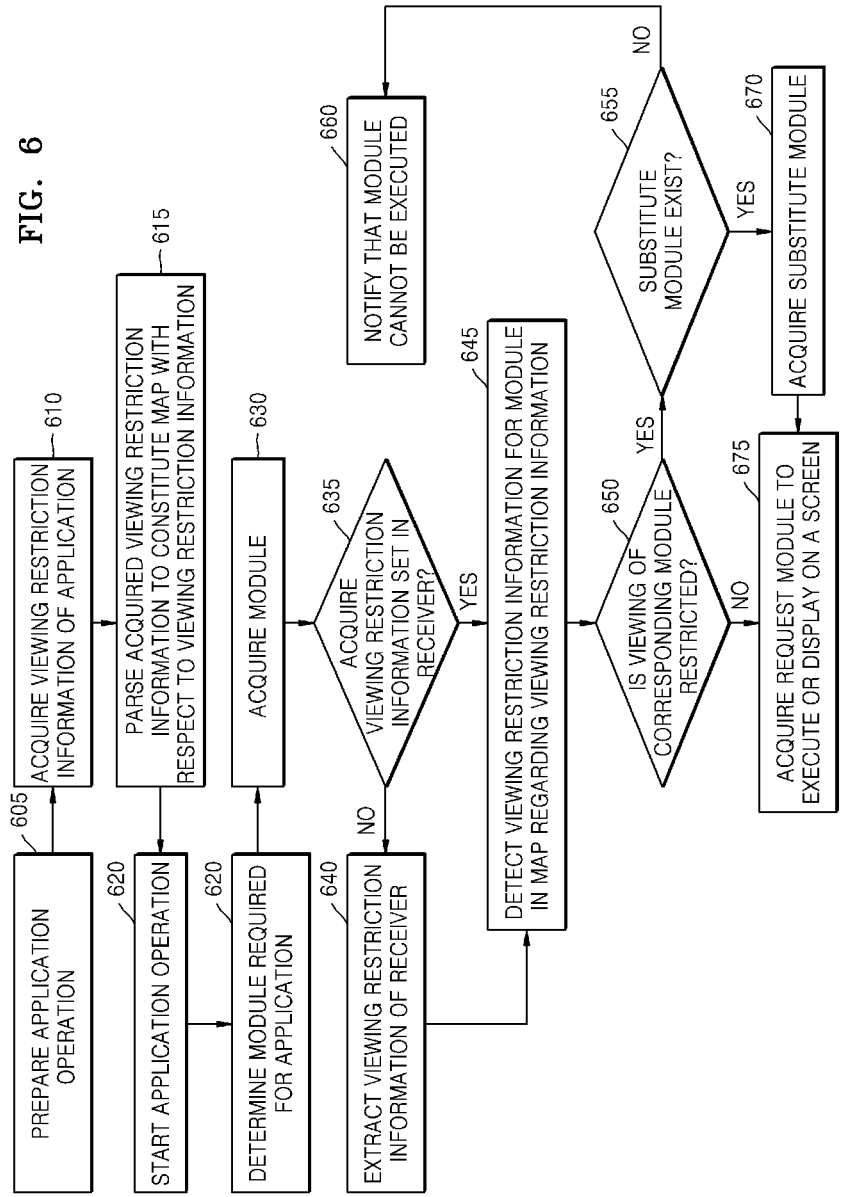

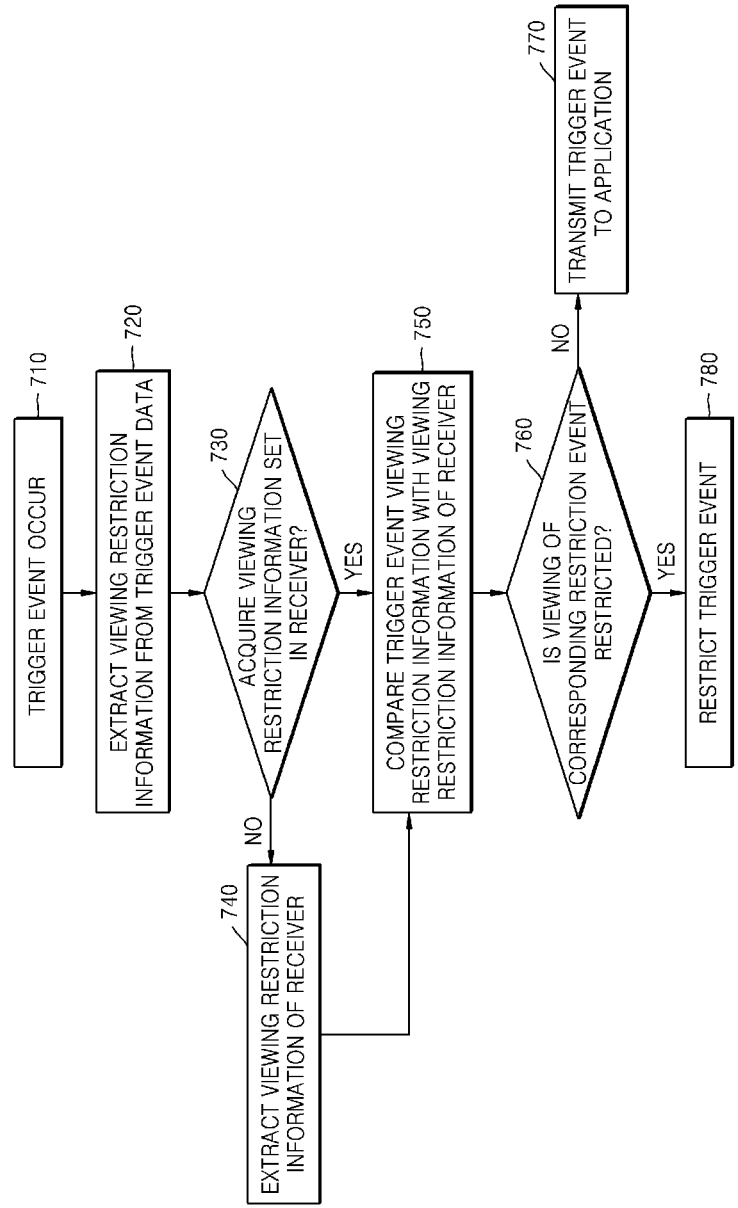

METHOD AND APPARATUS FOR TRANSMITTING AND RECEIVING VIEWING RESTRICTION INFORMATION OF APPLICATION

CROSS-REFERENCE TO RELATED PATENT APPLICATION

This application claims priority from Korean Patent Application No. 10-2008-0055843, filed on Jun. 13, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to transmitting and receiving viewing restriction information, and more particularly, to transmitting and receiving viewing restriction information of an application of data broadcasting.

2. Description of the Related Art

Generally, a viewing restriction rating is used in order to protect minors in a broadcasting environment including harmful programs by restricting the viewing of movies or broadcasting programs involving sex, violence, or the like, which are received by a digital television (TV) receiver.

For example, a viewing restriction rating with respect to a TV program of a North American type digital TV is restricted by Motion Picture Association of America (MPAA) and Television Parental Guidelines (TVPG).

TVPG restrict viewing by using ratings based on contents as well as ages. Examples of rating based on ages include TV-MA, TV-14, TV-PG, TV-G, etc.

A related art broadcasting viewing restriction method according to the Advanced Television System Committee (ATSC) standard will be described.

Generally, a broadcasting system includes a head-end and a terminal.

The head-end transmits a transport stream (TS) to the terminal. In this case, a single TS includes various element streams (ESs). Program map tables (PMTs) contain program information to be decoded. Each PMT is linked to a content advisory (CA) descriptor. In this regard, the CA descriptor provides content viewing restriction information (e.g., a parental rating).

However, a CA descriptor used in a conventional terrestrial digital TV broadcasting system is updated at regular periods. In addition, since the head-end needs to continue to update in order to set detailed viewing ratings, overhead may occur in the head-end.

In addition, recently, as digital broadcasting has rapidly developed, broadcasting stations have started transmitting various data broadcasting signals as well as video and audio signals. Thus, since a related art viewing restriction method applied through broadcasting or moving pictures is applied to moving image contents, it is difficult to apply the viewing restriction method to contents such as applications that are not dependent on a reproduction time of a moving image.

SUMMARY OF THE INVENTION

The present invention provides a method and apparatus for transmitting and receiving viewing restriction information, attaching a viewing restriction to each module of an application.

According to an aspect of the present invention, there is provided a method of receiving viewing restriction information, the method comprising acquiring an application and viewing restriction information set on a predetermined unit-by-unit basis of the application; and performing viewing restriction functions different for each predetermined unit of the application, based on the acquired viewing restriction information.

According to another aspect of the present invention, there is provided a method of receiving viewing restriction information, the method comprising when a trigger event occurs during data broadcasting, extracting viewing restriction information added to trigger event data of the application; and performing viewing restriction function with respect to the trigger event data according to the viewing restriction information.

According to another aspect of the present invention, there is provided a method of transmitting viewing restriction information, the method comprising setting viewing restriction information different for each module of an application; generating the viewing restriction information for each module of the application in a predetermined type file; and transmitting the viewing restriction information with respect to the application by using a predetermined communication protocol.

According to another aspect of the present invention, there is provided an apparatus for transmitting viewing restriction information, the apparatus comprising a viewing restriction information generating unit setting viewing restriction information of an application on a module-by-module basis, and generating the viewing restriction information for each module in a predetermined type file; and an information transmitting unit adding the viewing restriction information to content or a broadcasting packet so as to transmit the viewing restriction information by using a predetermined transmission protocol.

According to another aspect of the present invention, there is provided a computer readable recording medium having recorded thereon a program for executing a method of transmitting/receiving viewing restriction information, the medium comprising setting viewing restriction information dependant on a module of an application; generating the viewing restriction information for each module of the application in a predetermined type file; transmitting the viewing restriction information with respect to the application by using a predetermined communication protocol; acquiring the application and viewing restriction information set on a predetermined unit-by-unit basis of the application; and performing viewing restriction functions differently depending on the predetermined unit of the application, based on the acquired viewing restriction information.

BRIEF DESCRIPTION OF THE DRAWINGS

The above and other aspects of the present invention will become more apparent by describing in detail exemplary embodiments thereof with reference to the attached drawings in which:

FIG. 6 is a flow chart of a method of receiving viewing restriction information of application, according to an exemplary embodiment of the present invention; and FIG. 7 is a flow chart of a method of receiving viewing restriction information of application, according to another exemplary embodiment of the present invention.

DETAILED DESCRIPTION OF EXEMPLARY EMBODIMENTS OF THE INVENTION

Hereinafter, exemplary embodiments of the present invention will be described in detail with reference to the attached drawings.

Figure 1:
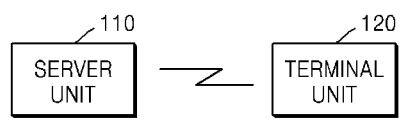
FIG. 1 illustrates a data broadcasting system capable of transmitting/receiving viewing restriction information, according to an exemplary embodiment of the present invention.

FIG. 1 illustrates a data broadcasting system capable of transmitting/receiving viewing restriction information, according to an exemplary embodiment of the present invention.

Data broadcasting is a service providing an application program related to a broadcasting program in addition to the broadcasting program by using a broadcasting network such as a terrestrial broadcasting network, a satellite broadcasting network or a cable broadcasting network. Currently, examples of international standards for data broadcasting include Open Cable Application Platform (OCAP), Advanced Common Application Platform (ACAP) and Multimedia Home Platform (MHP). In OCAP 1.0 Profile OC-SP-OCAP1.0-I16-050803 (hereinafter, referred to as "OCAP I16") and OC-SP-OCAP-DVR-I02-050524 (hereinafter, referred to as "OCAP I02"), which are included in OCAP, data broadcasting is supported by providing an application program interface (API) for storing recorded data in a predetermined storage.

Referring to FIG. 1, the data broadcasting system includes a server unit 110 and a terminal unit 120.

The server unit 110 sets viewing restriction information of an application for data broadcasting on a module-by-module basis, adds the viewing restriction information set on a module-by-module basis to the application, and then transmits the viewing restriction information set on a module-by-module basis together with the application to the terminal unit 120.

The application is configured in units of modules, wherein each application corresponding to a predetermined module has a predetermined meaning. The module is provided in the form of class file, image file, small video clip or text file.

The terminal unit 120 receives the application and the viewing restriction information of the application from the server unit 110, and performs viewing restriction functions, which are different for each a module, according to the received viewing restriction information. At this time, the terminal unit 120 contains viewing restriction information which has been previously set. The terminal unit 120 compares the received viewing restriction information with the viewing restriction information that has been previously set in the terminal unit 120, and then determines whether contents can be viewed, wherein the received viewing restriction information and the viewing restriction information, which has been previously set in the terminal unit 120, are each generated in the form of metadata or descriptor.

Figure 2:
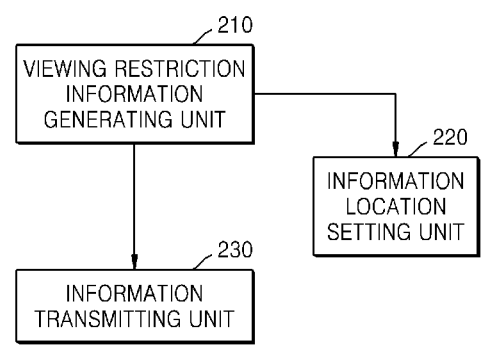
FIG. 2 illustrates an apparatus for transmitting viewing restriction information of a server unit illustrated in FIG. 1, according to an exemplary embodiment of the present invention.

FIG. 2 illustrates an apparatus for transmitting viewing restriction information of the server unit 110 illustrated in FIG. 1, according to an exemplary embodiment of the present invention.

Referring to FIG. 2, the apparatus for transmitting viewing restriction information includes a viewing restriction information generating unit 210, an information location setting unit 220 and an information transmitting unit 230.

The viewing restriction information generating unit 210 sets viewing restriction information of an application for data broadcasting on a module-by-module basis or on a directory-by-directory basis, and generates the viewing restriction information set on a module-by-module basis in the form of metadata or descriptor. At this time, the viewing restriction information may exist in the form of metadata or descriptor so as to be separated from contents, but the present invention is not limited to the form of the metadata or descriptor.

That is, the viewing restriction information may be set for each directory or for each file so as to be added to a permission request file designating authority with respect to the directory or the file, or alternatively, may be added to a description file of the application.

The information location setting unit 220 sets a location where the application is provided, and provides the viewing restriction information of the application to an Internet server (not shown) with reference to the location where the application is provided.

The information transmitting unit 230 adds the viewing restriction information generated by the viewing restriction information generating unit 210 to content or broadcasting packet, and transmits the viewing restriction information to the terminal unit 120.

Figure 3:
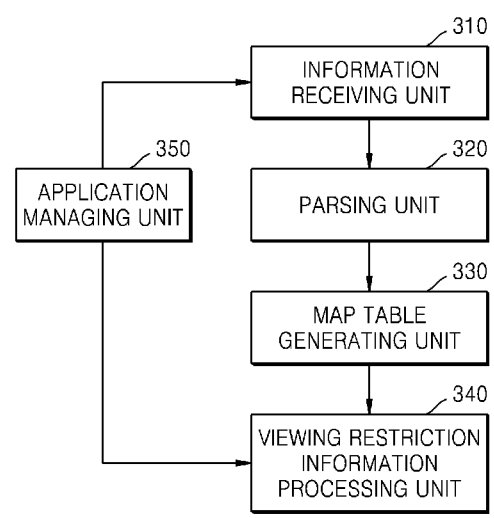
FIG. 3 illustrates an apparatus for receiving viewing restriction information of a terminal unit illustrated in FIG. 1, according to an exemplary embodiment of the present.

FIG. 3 illustrates an apparatus for receiving viewing restriction information of the terminal unit 120 illustrated in FIG. 1, according to an exemplary embodiment of the present.

Referring to FIG. 3, the apparatus for receiving viewing restriction information includes an information receiving unit 310, a parsing unit 320, a map table generating unit 330, a viewing restriction information processing unit 340 and an application managing unit 350.

The information receiving unit 310 acquires viewing restriction information of an application from data received by streaming or data received from an Internet server such as hypertext transfer protocol (HTTP).

The parsing unit 320 parses the viewing restriction information acquired in the information receiving unit 310 so as to extract viewing restriction information for each module of the application.

The map table generating unit 330 configures a map table using the viewing restriction information for each module, which is parsed in the parsing unit 320.

The viewing restriction information processing unit 340 performs a viewing restriction function, according to the viewing restriction information which is dependent on the module of the application, which is stored in the map table.

The application managing unit 350 requests that the information receiving unit 310 receives the application, and determines all modules required for the application with reference to the map table generated by the map table generating unit 330.

Figure 4A:
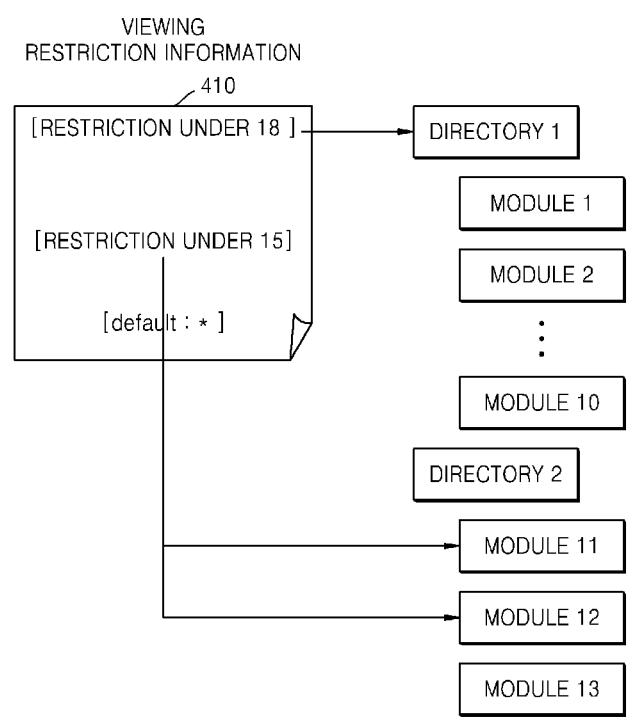
FIG. 4A illustrates an operation of setting viewing restriction information, according to an exemplary embodiment of the present invention.

FIG. 4A illustrates an operation of setting viewing restriction information, according to an exemplary embodiment of the present invention.

Referring to FIG. 4A, the application includes a plurality of directories, that is, first and second directories DIRECTORY 1 and DIRECTORY 2. In addition, the first directory DIRECTORY 1 includes a plurality of modules MODULE 1, MODULE 2, . . . , and MODULE 10, and the second directory DIRECTORY 2 includes a plurality of modules MODULE 11, MODULE 12 and MODULE 13.

The viewing restriction information may be set on a module-by-module basis or on a directory-by-directory basis, or may be categorized and set according to a rating.

That is, viewing restriction information representing restriction of viewing for under 18 years old is set to all of the modules MODULE 1, MODULE 2, . . . , and MODULE 10 of the first directory DIRECTORY 1, and viewing restriction information representing restriction of viewing for under 15 years old is set to the modules MODULE 11 and MODULE 12 of the second directory DIRECTORY 2. In addition, viewing restriction information "default:*" representing permission viewing for all ages is set to modules to which viewing restriction information is not set.

The following program is viewing restriction information written in extensible markup language (XML) on a module-by-module basis or on a directory-by-directory basis.

```
1)
<rating_description>
<dir name="com" rating="*">
<dir name="ocap" rating="*">
<file name="App.class" rating="TV-G"/>
<file name="XXX.jpg" rating="TV-MA"/>
</dir>
</dir>
</rating_description>
2)
<rating_description>
<rating="TV-G">
<dir name="test1">
<file name="*" /></dir>
<dir name="test2">
<file name="*" />
</dir>
</rating>
<rating="TV-PG">
<dir name="my1">
<file name="*" />
</dir>
<dir name="my2">
<file name="*" />
</dir>
</rating>
</rating_description>
```

Figure 4B:
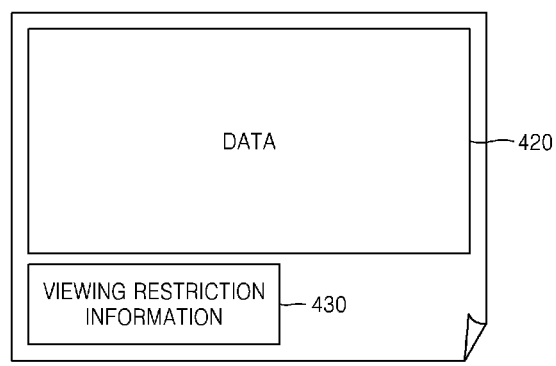
FIG. 4B illustrates an operation of setting viewing restriction information, according to another exemplary embodiment of the present invention.

FIG. 4B illustrates an operation of setting viewing restriction information, according to another exemplary embodiment of the present invention.

An application for data broadcasting includes predetermined modules for a trigger event linked to broadcasting.

At this time, viewing restriction information for each trigger event data provided by the data broadcasting is added to the application.

Referring to FIG. 4B, viewing restriction information 430 is added to trigger event data 420. Thus, if trigger event data related to broadcasting adversely affects some viewers, a terminal such as a TV or set top box (STB) cannot ignore the trigger event data 420 due to the set viewing restriction information.

Figure 4C:
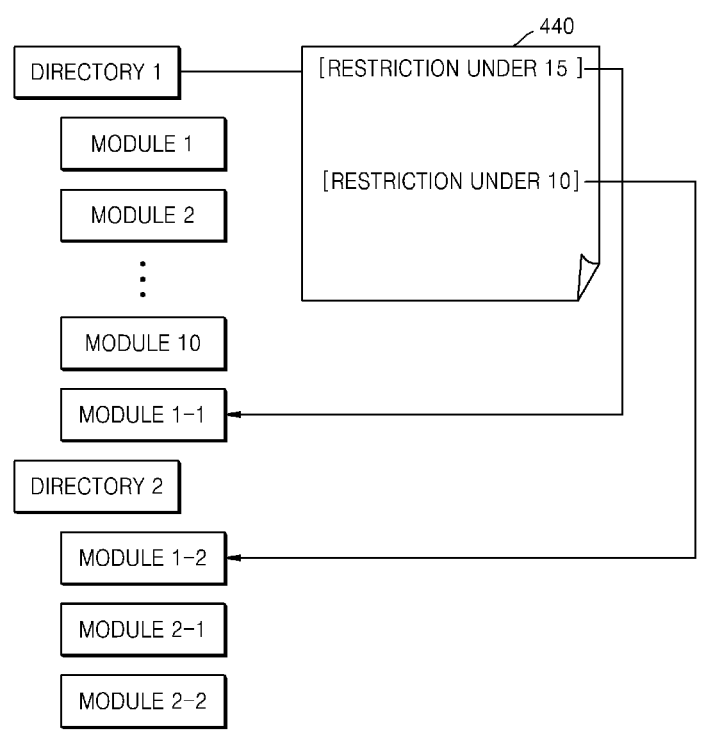
FIG. 4C illustrates an operation of setting viewing restriction information, according to another exemplary embodiment of the present invention.

FIG. 4C illustrates an operation of setting viewing restriction information 440, according to another exemplary embodiment of the present invention.

Referring to FIG. 4C, the application includes original modules and substitute modules of the original modules, according to the viewing restriction information 440.

In a first directory DIRECTORY 1, modules MODULE 1, MODULE 2, . . . , MODULE 10 correspond to the original modules. In addition, a module MODULE 1-1 of the first directory DIRECTORY 1 and a module MODULES 1-2 of the second directory DIRECTORY 2 correspond to the substitute modules. A location of the substitute module is set according to the viewing restriction information 440.

For example, when the viewing restriction information 440 represents "under 15 years old", the substitute module MODULE 1-1 of the original module MODULE 1 is displayed on a screen. In addition, when the viewing restriction information 440 represents "under 10 years old", the substitute module MODULE 1-2 is displayed on the screen.

The following program is an example of viewing restriction information written in XML.

```
<rating_description>
<dir name="test1">
<file name="Main.class" rating="TV-MA">
<file name="Main.class" rating="TV-PG" replace="Main1.class" >
<file name="Main.class" rating="TV-G"
replace="Directory2.Main.class" >
</dir>
</rating_description>
```

Figure 5:
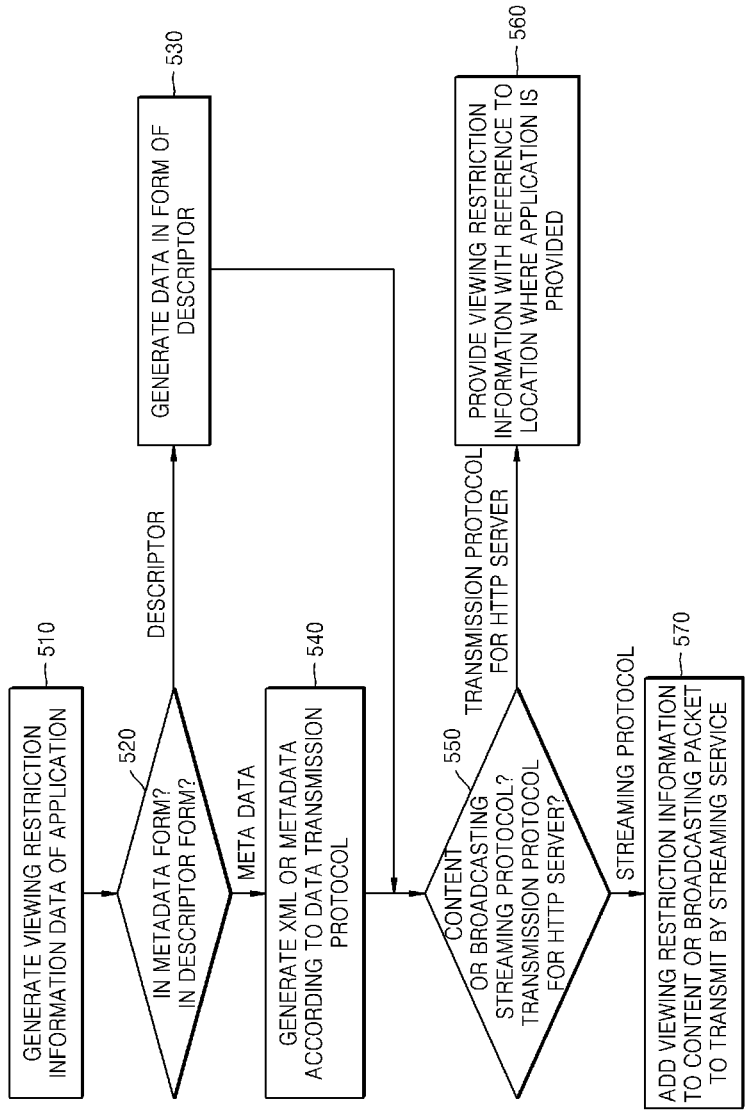
FIG. 5 is a flow chart of transmitting viewing restriction information of application, according to an exemplary embodiment of the present invention.

FIG. 5 is a flow chart of transmitting viewing restriction information of an application, according to an exemplary embodiment of the present invention.

The viewing restriction information of the application is generated on a module-by-module basis or on a directory-by-directory basis (operation 510).

Next, it is selected whether the viewing restriction information is to be generated in the form of XML, metadata or descriptor (operation 520).

If it is selected that the viewing restriction information is to be generated in the form of XML or metadata, the viewing restriction information is generated in the form of XML or metadata, according to a data transmission protocol (operation 540).

Alternatively, if it is selected that the viewing restriction information is to be generated in the form of descriptor, the viewing restriction information is generated in the form of descriptor (operation 530).

Next, it is determined whether the communication protocol is a content or broadcasting streaming protocol, or a transmission protocol method for an HTTP server (operation 550).

If it is determined that the communication protocol is the content or broadcasting streaming protocol, the viewing restriction information is added to content data or packet data and is transmitted by streaming service (operation 570).

Alternatively, if it is determined that the data transmission method is the transmission method for the HTTP server, with reference to a location of the viewing restriction information providing application, the viewing restriction information of the application is transmitted to the HTTP server for on-demand (operation 560).

FIG. 6 is a flow chart of a method of receiving viewing restriction information of an application, according to an exemplary embodiment of the present invention.

First, data received by streaming service and an application received from an Internet server (e.g., an HTTP server) are stored in a memory, and a content providing server is interfaced so as to prepare a loading operation of the data and a reproducing operation of the application (operation 605).

Next, an application and viewing restriction information of the application are acquired (or, stored) from the data received by streaming service and the application received from the Internet server (operation 610). At this time, the viewing restriction information is added to content data in the form of metadata or descriptor.

The acquired viewing restriction information is parsed so as to constitute a map table regarding the viewing restriction information (operation 615). The map table stores various pieces of viewing restriction information stored for each respective module of the application.

An operation of the application is started (operation 620).

Modules required for performing the operation of the application are determined (operation 625).

Next, the modules required for performing the operation of the application are loaded and reproduced from a memory (operation 630).

It is determined whether viewing restriction information that has been previously set in a receiver is acquired (operation 635).

If it is determined that the viewing restriction information set in the receiver is not acquired, the viewing restriction information set in the receiver is extracted (operation 640).

If it is determined that the viewing restriction information set in the receiver is acquired, viewing restriction information for each module is detected from the map table regarding the viewing restriction information (operation 645).

The viewing restriction information set in the receiver is compared with the viewing restriction information for each module, which is detected from the map table, so as to determine whether viewing of a corresponding module is restricted (operation 650).

If it is determined that the viewing of a module is not restricted, the module is executed or is display on a screen (operation 675).

If it is determined that the viewing of the module is restricted, it is determined whether a substitute module of the module exists (operation 655). If it is determined that the substitute module does not exist, it is notified that the corresponding module cannot be executed (operation 660). If it is determined that the substitute module exists, the substitute module is acquired so as to be displayed on a screen (operation 670).

FIG. 7 is a flow chart of a method of receiving viewing restriction information of an application, according to another exemplary embodiment of the present invention.

First, when a trigger event occurs during data broadcasting (operation 710), viewing restriction information added to trigger event data of an application is extracted (operation 720).

Next, it is determined whether viewing restriction information that has been previously set in a receiver is acquired (operation 730).

If it is determined that the viewing restriction information set in the receiver is not acquired, the viewing restriction information set in the receiver is extracted (operation 740).

If it is determined that the viewing restriction information set in the receiver is acquired, the viewing restriction information set in the receiver is compared with the viewing restriction information added to the event data (operation 750).

Next, it is determined whether viewing of a trigger event data is restricted, according to a result of the comparison of the viewing restriction information added to the trigger event data and the viewing restriction information set in the receiver (operation 760).

If it is determined that the viewing of the trigger event data is restricted, the trigger event data is restricted (operation 780).

If it is determined that the viewing of the trigger event data is not restricted, the trigger event data is added to the application (operation 770).

According to the above exemplary embodiments of the present invention, minors can be protected in a broadcasting environment including harmful programs by providing viewing restriction information to each module of an application.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The present invention can also be embodied as computer readable codes on transmitted via carrier waves, such as data transmission through the Internet.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of receiving viewing restriction information, the method comprising:
    providing at least one application related to a broadcasting program in addition to the broadcast program, wherein each of the at least one application comprises a plurality of directories, and each of the plurality of directories comprises a plurality of modules;
    acquiring the at least one application and viewing restriction information set differently on a predetermined directory-by-directory basis or a predetermined module-by-module basis corresponding to the plurality of directories and the plurality of modules of the at least one application; and
    performing viewing restriction functions differently for each directory of the plurality of directories, and for each module of the plurality of modules of the at least one application, based on the viewing restriction information which is acquired,
    wherein the at least one application is not the broadcasting program, and is configured in units of modules which is not dependent on a reproduction time of a moving image of the broadcasting program.

2. The method of claim 1, wherein the viewing restriction information is a metadata type or a descriptor type.

3. The method of claim 1, wherein the viewing restriction information which is acquired is stored in a map table representing viewing restriction information for each directory and each module.

4. The method of claim 1, wherein the performing the viewing restriction functions comprises:
    comparing viewing restriction information set in a receiver with the viewing restriction information for each directory and each module, which is stored in the map table; and determining a rating with respect to each directory and each module of the application based on a result of the comparing.

5. The method of claim 4, wherein the determining of the rating comprises:
determining whether the viewing of the corresponding module is to be restricted;
if it is determined that viewing of the corresponding module is determined to be restricted, determining whether a substitute module of the module of the application exists;
if it is determined that the substitute module exists, executing the substitute module of the application; and
if it is determined that the substitute does not exist, notifying the module of the application cannot be executed.

6. The method of claim 1, wherein the application is independent of a reproduction time of a moving image.

7. The method of claim 1, wherein each of the at least one application corresponding to a predetermined directory or a predetermined module has a predetermined meaning which is not dependent on a reproduction time of a moving image of the broadcasting program.

8. A method of transmitting viewing restriction information, the method comprising:
providing at least one application related to a broadcasting program in addition to the broadcast program, wherein each of the at least one application comprises a plurality of directories, and each of the plurality of directories comprises a plurality of modules;
setting viewing restriction information differently for each directory of the plurality of directories of the application;
generating the viewing restriction information for each directory of the plurality of directories in a predetermined type file; and
transmitting the viewing restriction information with respect to the application using a predetermined communication protocol,
wherein the at least one application is not the broadcasting program, and is configured in units of modules which is not dependent on a reproduction time of a moving image of the broadcasting program.

9. The method of claim 8, wherein the setting the viewing restriction information comprises:
setting the plurality of modules in several groups; and
setting viewing restriction information independently for each group.

10. The method of claim 8, wherein the application comprises a plurality of directories and each directory of the plurality of directories comprises at least one module of the plurality of modules, and the method further comprises setting the viewing restriction information differently for each directory of the application.

11. The method of claim 8, wherein the setting the viewing restriction information comprises adding viewing restriction information to trigger event data.

12. The method of claim 8, wherein the setting of the viewing restriction information comprises setting a substitute module of an original module according to the viewing restriction information.

13. The method of claim 8, wherein the viewing restriction information is generated in the form of metadata or descriptor.

14. An apparatus for transmitting viewing restriction information, the apparatus comprising:
a receiving unit which receives at least one application related to a broadcasting program in addition to the broadcast program, wherein each of the at least one application comprises a plurality of directories, and each of the plurality of directories comprises a plurality of modules;
a viewing restriction information generating unit which sets viewing restriction information of the application differently on a directory-by-directory basis corresponding to the plurality of directories, and generates the viewing restriction information for each directory of the plurality of directories in a predetermined type file; and
an information transmitting unit which adds the viewing restriction information to content or a broadcasting packet so as to transmit the viewing restriction information using a predetermined transmission protocol,
wherein the at least one application is not the broadcasting program, and is configured in units of modules which is not dependent on a reproduction time of a moving image of the broadcasting program.

15. The apparatus of claim 14, further comprising an information locating setting unit which provides the viewing restriction information with reference to a location where the application is provided.

16. An apparatus for receiving viewing restriction information, the apparatus comprising:
a terminal unit which receives at least one application related to a broadcasting program in addition to the broadcast program, wherein each of the at least one application comprises a plurality of directories, and each of the plurality of directories comprises a plurality of modules;
an information receiving unit which acquires the application and viewing restriction information of the application from data received from a server;
a parsing unit which parses the viewing restriction information acquired by the information receiving unit so as to extract viewing restriction information for each directory of the plurality of directories of the application on a module-by-module basis;
a map table generating unit which generates a map table by using the viewing restriction information for each directory of the plurality of directories, which is parsed by the parsing unit;
a viewing restriction information processing unit which performs viewing restriction functions, which are different depending on each directory of the application, using the viewing restriction information for each directory of the plurality of directories, which is generated by the map table generating unit,
wherein the at least one application is not the broadcasting program, and is configured in units of modules which is not dependent on a reproduction time of a moving image of the broadcasting program.

17. The apparatus of claim 16, further comprising an application managing unit which requests that the information receiving unit receives the application, and determines a module required for the application with reference to the map table of the map table generating unit.

18. A non-transitory computer readable recording medium having recorded thereon a program for executing a method of receiving viewing restriction information, the medium comprising:
providing at least one application related to a broadcasting program in addition to the broadcast program, wherein each of the at least one application comprises a plurality of directories, and each of the plurality of directories comprises a plurality of modules;

setting viewing restriction information differently for each directory of the plurality of directories of the application;

generating the viewing restriction information for each directory of the plurality of directories in a predetermined type file; and transmitting the viewing restriction information with respect to the application using a predetermined communication protocol, wherein the at least one application is not the broadcasting program, and is configured in units of modules which is not dependent on a reproduction time of a moving image of the broadcasting program.

19. A non-transitory computer readable recording medium having recorded thereon a program for executing a method of transmitting viewing restriction information, the medium comprising:

providing at least one application related to a broadcasting program in addition to the broadcast program, wherein each of the at least one application comprises a plurality of directories, and each of the plurality of directories comprises a plurality of modules; acquiring the at least one application and viewing restriction information set differently on a predetermined directory-by-directory basis or a predetermined module-by-module basis corresponding to the plurality of directories and the plurality of modules of the at least one application; and performing viewing restriction functions differently for each directory of the plurality of directories, and for each module of the plurality of modules of the at least one application, based on the viewing restriction information which is acquired, wherein the at least one application is not the broadcasting program, and is configured in units of modules which is not dependent on a reproduction time of a moving image of the broadcasting program.

* * * * *